United States Patent [19]
Arimilli et al.

[11] Patent Number: 6,161,189
[45] Date of Patent: Dec. 12, 2000

[54] LATCH-AND-HOLD CIRCUIT THAT PERMITS SUBCIRCUITS OF AN INTEGRATED CIRCUIT TO OPERATE AT DIFFERENT FREQUENCIES

[75] Inventors: Ravi Kumar Arimilli, Austin; Jerry Don Lewis, Round Rock; Derek Edward Williams, Austin, all of Tex.

[73] Assignee: International Business Machines Corporation, Armonk, N.Y.

[21] Appl. No.: 08/992,132

[22] Filed: Dec. 17, 1997

Related U.S. Application Data

[63] Continuation-in-part of application No. 08/829,567, Mar. 31, 1997, Pat. No. 5,937,167.
[51] Int. Cl.$^7$ ................................................... G06F 1/04
[52] U.S. Cl. ...................... 713/600; 713/400; 713/500
[58] Field of Search .................................. 713/400, 401, 713/500, 501, 503, 600, 601

[56] References Cited

U.S. PATENT DOCUMENTS

| | | | |
|---|---|---|---|
| 5,455,931 | 10/1995 | Camporese et al. | 395/556 |
| 5,710,910 | 1/1998 | Kehl et al. | 713/500 |
| 5,828,868 | 10/1998 | Sager et al. | 713/501 |
| 5,884,100 | 3/1999 | Normoyle et al. | 710/52 |
| 5,937,167 | 8/1999 | Arimilli et al. | 709/223 |

*Primary Examiner*—Dennis M. Butler
*Attorney, Agent, or Firm*—Volel Emile; Felsman, Bradley, Vaden, Gunter & Dillon, LLP

[57] ABSTRACT

An integrated circuit comprises a semiconductor substrate having integrated circuitry formed therein. According to the present invention, the integrated circuitry includes a plurality of subcircuits, including first and second subcircuits that concurrently operate at diverse first and second frequencies, respectively. According to one embodiment, the integrated circuit has a clock signal that alternates between an active state and an inactive state at a third frequency and is broadcast to all of the subcircuits. In this embodiment, at least one subcircuit among the plurality of subcircuits, for example, a processor, operates in response to the clock signal at the third frequency, which is higher than the first frequency. According to another embodiment, the subcircuits each communicate with at least one other subcircuit via a latch-to-latch interface.

31 Claims, 6 Drawing Sheets

LATCH-AND-HOLD CIRCUIT THAT PERMITS SUBCIRCUITS OF AN INTEGRATED CIRCUIT TO OPERATE AT DIFFERENT FREQUENCIES

This application is a continuation-in-part of application Ser. No. 08/829,567, filed Mar. 31, 1997, entitled "METHOD AND SYSTEM FOR COMMUNICATING DATA IN A DATA PROCESSING SYSTEM HAVING A SELECTABLE FREQUENCY TIMING SIGNAL," by Ravi K. Arimilli and Jerry D. Lewis now U.S. Pat. No. 5,937,167.

BACKGROUND OF THE INVENTION

1. Technical Field

The present invention relates in general to integrated circuitry and in particular to an improved integrated circuit design that permits subcircuits within an integrated circuit to concurrently operate at different frequencies. Still more particularly, the present invention relates to an improved integrated circuit design that minimizes the effects of clock skew.

2. Description of the Related Art

At various stages in the historical development of integrated circuitry, integrated circuit designers have had to overcome different problems in order to reach higher performance benchmarks. Currently, large state-of-the-art integrated circuits such a microprocessors, which can include over 2 million transistors, can operate at clock frequencies of 300 MHz, 400 MHz and even higher. However, a number of problems must be overcome in order to be able to manufacture production quantities of large, complex integrated circuits capable of achieving clock speeds on the order of 1 GHz. One such problem is clock skew.

Clock skew results when clock signals are broadcast throughout a large semiconductor substrate. Because of propagation delays, the clock signals received by some portions of the integrated circuit may lag or lead those received by other portions of the integrated circuit. Clock skew is problematical since integrated circuits are typically designed so that all circuitry formed within a semiconductor substrate operates synchronously in response to the broadcast clock signals. Thus, when a signal is passed between two portions of the integrated circuit, the circuitry may fail to capture the signal or may erroneously detect the presence of a signal. While some clock skew is unavoidable and may not be detrimental to the proper operation of integrated circuits that operate at lower clock frequencies, clock skew becomes a critical design constraint as clock frequencies increase due to the decreased margin for timing errors. Moreover, efforts to reduce clock skew are exacerbated by the increasing size of integrated circuits. Thus, it is a challenge to develop a chip "floor plan" that permits signals to be transmitted between distant portions of the integrated circuitry without skew-induced errors.

A second related problem facing today's integrated circuit designers is the requirement that all integrated circuitry formed within a single semiconductor substrate operate at a common clock frequency. Because of the complexity of the logic, it is technically difficult for some portions of an integrated circuit design to be adapted to high frequency operation. Retaining the requirement that an entire integrated circuit operate at a single frequency can entail an unacceptably long development time and/or a large amount of additional logic to parallelize logical operations.

In order to overcome these obstacles to the realization of large, high-clock-speed (e.g., 1 GHz) integrated circuits, a new integrated circuit paradigm is required, which permits portions of the integrated circuit to operate independently at diverse frequencies and which minimizes the deleterious effects of clock skew.

SUMMARY OF THE INVENTION

It is therefore one object of the present invention to provide an improved integrated circuit.

It is another object of the present invention to provide an improved integrated circuit design that permits subcircuits within an integrated circuit to concurrently operate at different frequencies.

It is still another object of the present invention to provide an improved integrated circuit design that minimizes the effects of clock skew.

The foregoing objects are achieved as is now described. An integrated circuit is provided that includes a semiconductor substrate having integrated circuitry formed therein. According to the present invention, the integrated circuitry includes a plurality of subcircuits, including first and second subcircuits that concurrently operate at diverse first and second frequencies, respectively. According to one embodiment, the integrated circuit has a clock signal that alternates between an active state and an inactive state at a third frequency and is broadcast to all of the subcircuits. In this embodiment, at least one subcircuit among the plurality of subcircuits, for example, a processor, operates in response to the clock signal at the third frequency, which is higher than the first frequency. According to another embodiment, the subcircuits each communicate with at least one other subcircuit via a latch-to-latch interface.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
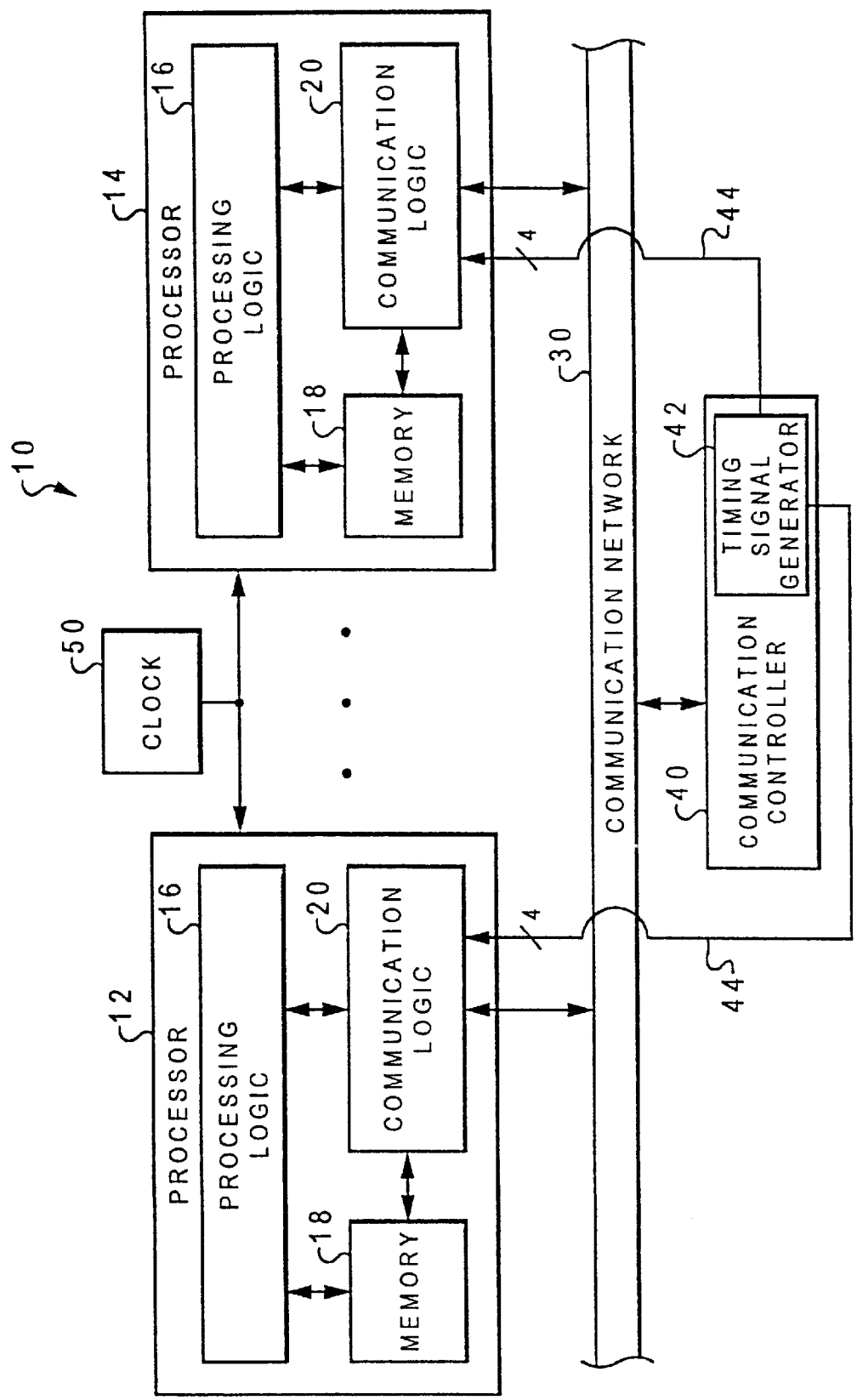
FIG. 1 is a block diagram representation of an illustrative embodiment of a first data processing system in accordance with the present invention.

With reference now to the figures and in particular with reference to FIG. 1, there is illustrated a first multiprocessor data processing system with which the present invention may advantageously be utilized. As depicted, data processing system 10 includes processors 12 and 14, as well as additional unillustrated devices represented by ellipsis notation, which are all coupled to communication network 30. Processors 12 and 14, which both operate in response to fixed-frequency clock 50, each include processing logic 16, which comprises circuitry for processing instructions and data. Local storage for instructions and data is provided by memory 18, which may include one or more register files and one or more levels of cache memory. Each of processors 12 and 14 further includes communication logic 20, which is coupled to communication network 30 in order to permit communication of threads, interrupts, data, and other information between processors 12 and 14 and other devices that may optionally be coupled to communication network 30.

The physical structure of communication network 30 is implementation-specific and may depend upon numerous factors, such as the number of devices coupled to communication network 30 and the desired communication bandwidth and performance. For example, in an embodiment of the present invention in which data processing system 10 comprises a workstation such as the RS/6000, available from International Business Machines Corporation (IBM), communication network 30 may comprise a shared system bus. In alternative embodiments of the present invention, communication network 30 may comprise an Application Specific Integrated Circuit (ASIC) chipset to which each device is coupled for point-to-point communication.

As illustrated in FIG. 1, communication across communication network 30 is managed by communication controller 40. As will be appreciated by persons skilled in the computer arts, the logic within communication controller 40 utilized to manage communication on communication network 30 is necessarily dependent upon the implementation of communication network 30 and may include, for example, arbitration logic and other control circuitry. Regardless of the implementation of communication network 30, communication controller 40 includes a timing signal generator 42 that generates timing signals 44, four of which are coupled to communication logic 20 within processor 12 and four of which are coupled to communication logic 20 within processor 14. Timing signals 44 have independently selectable frequencies and duty cycles, which are set by communication controller 40. In accordance with an important aspect of the present invention and as discussed in detail below, communication logic 20 within each of processors 12 and 14 performs communication transactions on communication network 30 at a rate determined by the selectable frequency of its respective timing signals 44.

Figure 2:
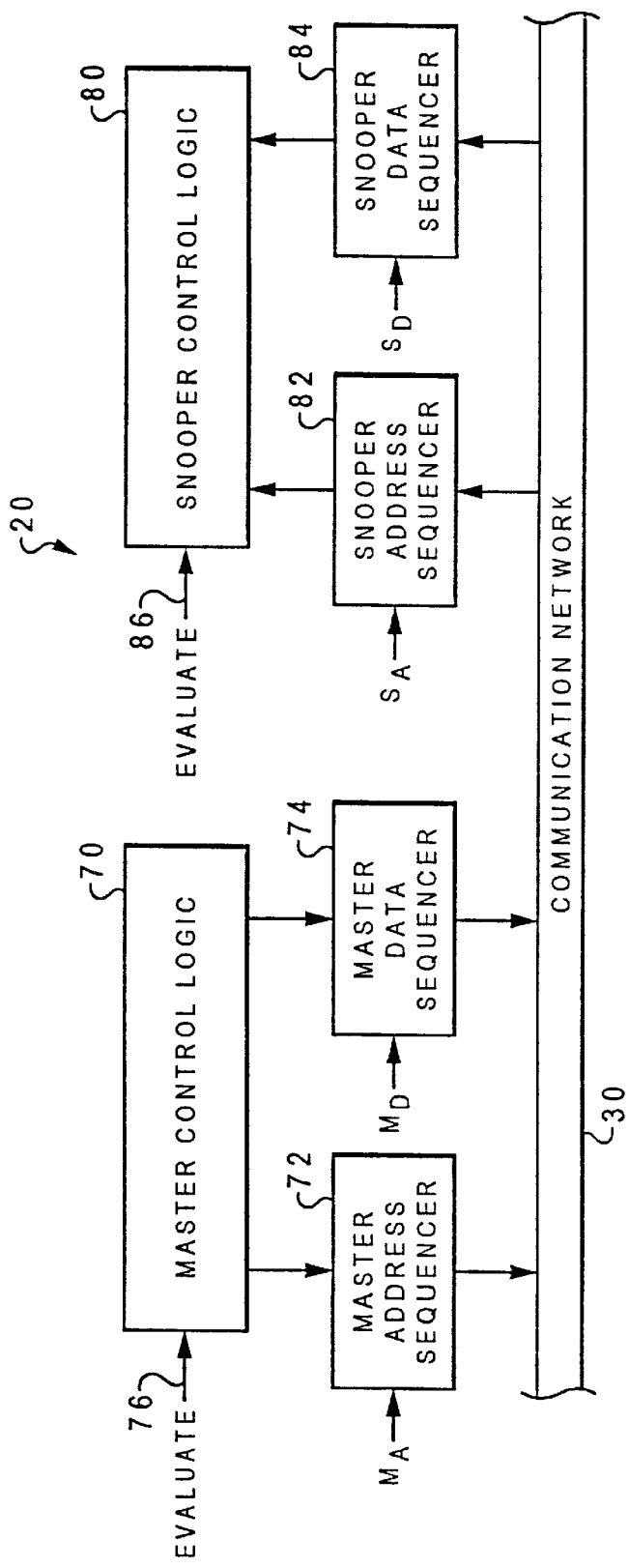
FIG. 2 illustrates a detailed block diagram of the communication illustrated in FIG. 1.

Referring now to FIG. 2, there is depicted a more detailed block diagram representation of communication logic 20 in each of processors 12 and 14. As illustrated, communication logic 20 includes master circuitry, comprising master control logic 70, master address sequencer 72, and master data sequencer 74. Master control logic 70 initiates (launches) transactions on communication network 30 in accordance with a selected communication protocol, such as the 6xx bus protocol developed by IBM. Accordingly, in response to receipt of a request to initiate a communication transaction on communication network 30, master control logic 70 asserts the appropriate control signals to signify the initiation of a bus transaction. For example, in an embodiment of the present invention in which communication network 30 comprises a shared system bus, master control logic 70 asserts address and data bus request signals in response to receipt of a store request from processing logic 16. Master control logic 70 then passes the address and data, if any, associated with the communication transaction to master address sequencer 72 and master data sequencer 74, respectively. Although individual logic gates within master control logic 70 are clocked by the clock signal generated by clock 50 (as are all of the logic gates within processors 12 and 14), transitions between states of the communication protocol state machine implemented by master control logic 70 are made in response to evaluate signal 76, which is described in greater detail below with reference to FIGS. 3, 4A and 4B.

In response to receipt of an address and data from master control logic 70, master address and data sequencers 72 and 74 drive the address and data associated with the communication transaction on communication network 30 in response to $m_A$ and $m_D$, respectively, which are two of timing signals 44.

As is further illustrated in FIG. 2, communication logic 20 also includes a snooper comprising snooper control logic 80, snooper address sequencer 82, and snooper data sequencer 84. Snooper control logic 80 monitors communication transactions on communication network 30 and identifies transactions addressed to the processor containing communication logic 20, for example, by examining transaction or processor IDs. In response to detection of a communication transaction addressed to the associated one of processors 12 and 14, snooper control logic 80 causes snooper address sequencer 82 and snooper data sequencer 84 to latch the address and data, respectively, associated with the communication transaction. Similar to master address and data sequencers 72 and 74, snooper address and data sequencers 82 and 84 latch the address and data from communication network 30 in response to timing signals $s_A$ and $s_D$, respectively, which are two of timing signals 44. Addresses and data latched from communication network 30 by snooper address and data sequencers 82 and 84 are passed to snooper control logic 80, which thereafter processes the addresses and data in accordance with the communication protocol. As discussed above with respect to master control logic 70, snooper control logic 80 makes transitions between states in the communication protocol in response to evaluate signal 86.

As noted above, each of timing signals 44 generated by communication controller 40 has a selectable frequency that can be set independently of all other timing signals 44. The ability of communication controller 40 to individually control the operation of each of sequencers 72, 74, 82, and 84 within each of processors 12 and 14 (as well as in other devices coupled to communication network 30) provides numerous advantages over prior art systems in which all devices coupled to a shared system bus operate at a fixed frequency ratio with respect to the processor clock frequency.

First, communication controller 40 can set the frequency of all timing signals 44 transmitted to devices participating in a particular communication transaction to the highest frequency supported by all devices participating in the communication transaction. Thus, the rate of communication is not constrained by the slowest device coupled to communication network 30, but is rather determined by the slowest device participating within an individual communication transaction.

Second, communication controller 40 can individually set each of timing signals 44 to its own unique frequency. Thus, communication controller 40 can cause each of sequencers 72, 74, 82, and 84 in each of processors 12 and 14 to operate at a different rate. This capability permits absolute control of the time between the launch of an address by master address sequencer 72 in one of processors 12 and 14 and the latching of the address by snooper address sequencer 82 in the other of processors 12 and 14. Similarly, communication controller 40 has complete control over the interval between the launch of data by master data sequencer 74 in one of processors 12 and 14 and the latching of data by snooper data sequencer 84 in the other of processors 12 and 14. In addition, communication controller 40 can control the relative timing of the launch of address and data by master address and data sequencers 72 and 74.

This precise control of the timing of data and address communication within each communication transaction gives great freedom in the design of communication network 30. For example, instead of implementing communication network 30 as a conventional shared system bus, communication network 30 can be implemented with an ASIC chipset that permit point-to-point communication. In this point-to-point implementation, multiple devices can simultaneously launch addresses and data onto communication network 30, thereby improving overall communication throughput. Importantly, by controlling communication transaction timings, the present invention enables such alternative embodiments of communication network 30 to be implemented without any modification to the selected communication protocol.

Controlling communication transaction timings utilizing communication controller 40 also permits increased freedom in the manner communication transactions are prioritized. For example, in an embodiment of the present invention in which communication network 30 comprises a shared system bus and in which all communication transactions are tagged with an ID, communication controller 40 can permit a first device to begin a first communication transaction, then permit a higher priority device to "interrupt" the first communication transaction with a second communication transaction, and thereafter permit the first device to resume the first communication transaction. Communication controller 40 can suspend the first communication transaction in this manner simply by maintaining the appropriate timing signals in the inactive state until the second communication transaction is complete.

Figure 3:
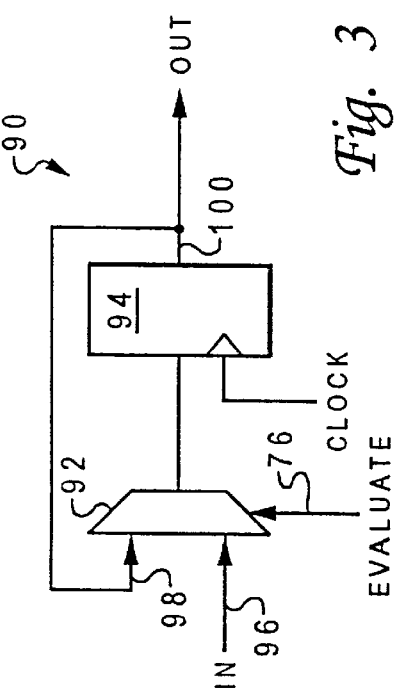
FIG. 3 depicts an illustrative embodiment of a latch-and-hold circuit within the master control logic depicted in FIG. 2.

With reference now to FIG. 3, there is depicted an illustrative embodiment of a latch-and-hold circuit within master control logic 70. As depicted, latch-and-hold circuit 90 comprises multiplexer 92 and latch 94. Multiplexer 92 has a data input 96 and a feedback input 98, which is coupled to latch output 100. Multiplexer 92 selects the data presented at data input 96 as an output if evaluate signal 76 is active and selects the data presented at feedback input 98 as an output if evaluate signal 76 is inactive. Snooper control logic 80 includes one or more similarly configured latch-and-hold circuits that operate in response to evaluate signal 86.

According to an important aspect of the present invention, evaluate signals 76 and 86, which ordinarily have a lower frequency than clock 50, for example, by a 2:1 ratio, can selectively alternate between active and inactive states at the frequency of clock 50. As described below with reference to FIGS. 4A and 4B, selective evaluation of particular latches within master control logic 70 and snooper control logic 80 at the frequency of clock 50 permits states in the communication protocol state machine to be rapidly traversed when such states are independent of the timing of communication transactions on communication network 30.

Figure 4A:
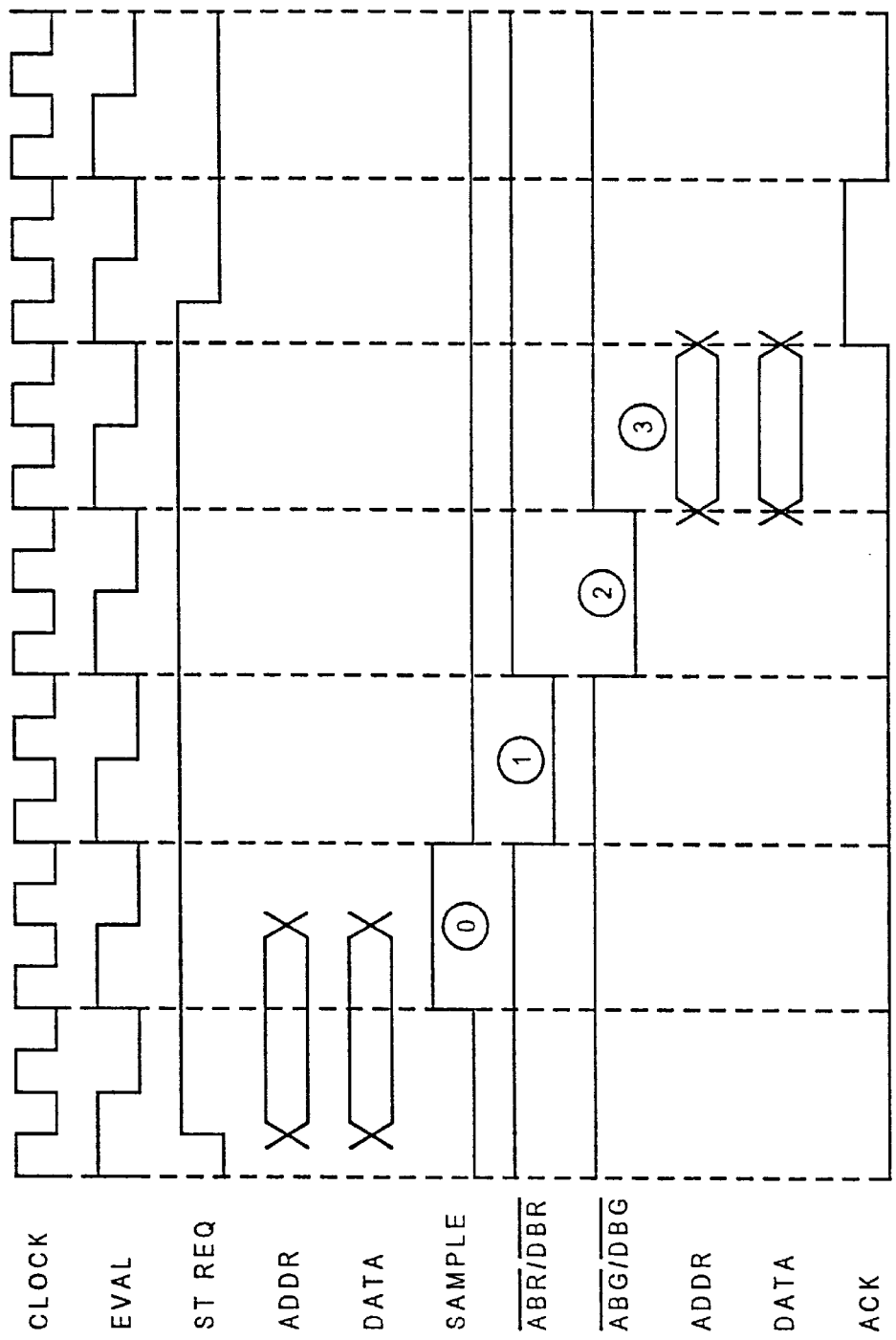
FIGS. 4A and 4B are timing diagrams illustrating the communication efficiency that results from selectively operating portions of the communication logic at processor clock frequency.

Referring now to FIG. 4A, there is depicted a timing diagram illustrating the timing of a store operation in a conventional processor having a fixed 2:1 ratio between the processor clock frequency and the communication logic evaluation signal. As illustrated, the store operation is initiated when a store request (ST REQ) is asserted in conjunction with an address and data. In response to a detection of the store request, communication logic within the processor samples the address and data at the next rising edge of the evaluation signal following the assertion of the store request. As illustrated in FIG. 4A, sampling the address and data driven by the processing logic corresponds to state 0 of the communication protocol implemented by the communication logic.

After sampling the address and data, the communication logic makes a transition to state 1 at the next rising edge of the evaluation signal. In state 1, the communication logic asserts an address bus request (ABR) and a data bus request (DBR). The communication logic then changes from state 1 to state 2 at the next rising edge of the evaluation signal in response to receipt of an address bus grant (ABG) and a data bus grant (DBG). Next, the communication logic makes a transition to state 3 at the next rising edge of the evaluation signal and drives the address and data received on the shared system bus. Thereafter, in response to receipt of an acknowledgement signal, the store request is removed.

Figure 4B:
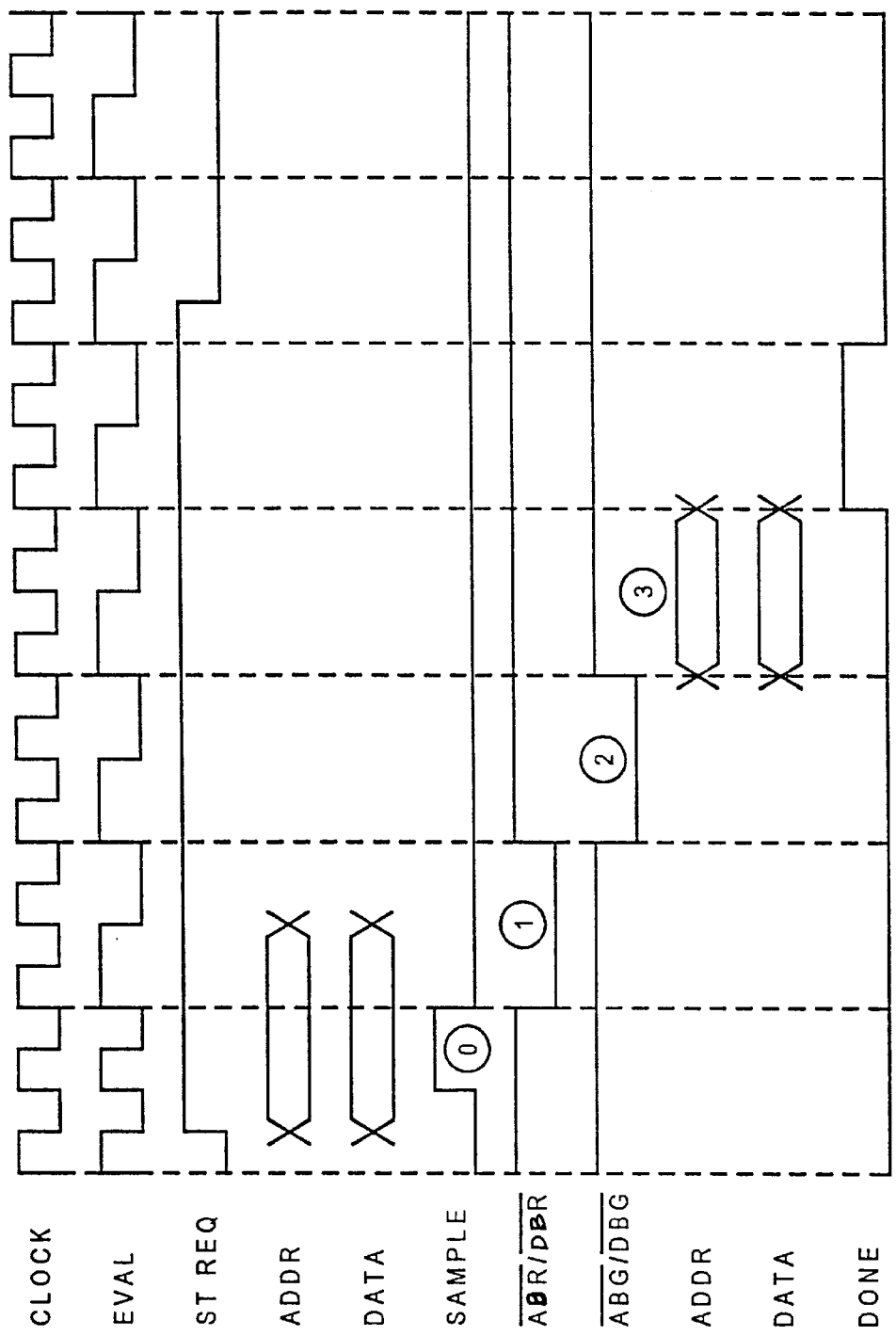

Referring now to FIG. 4B, there is depicted a timing diagram of a similar store operation in accordance with the present invention. In accordance with an important aspect of the present invention, logic within master control logic 70 and snooper control logic 80 that does not affect transactions on communication network 30 may selectively be operated at the frequency of clock 50 in order to improve communication performance. Thus, as depicted in FIG. 4B, in response to receipt of a store request from processing logic 16, evaluate signal 76 of the latch-and-hold circuit 90 that samples the data driven by processing logic 16 is selectively set to the frequency of clock 50. The address and data driven by processing logic 16 is therefore sampled one full processor clock cycle earlier than in the prior art store operation illustrated in FIG. 4A.

Thereafter, evaluate signal 76 is set to alternate between active and inactive states at half of the frequency of clock 50. Thus, master control logic 70 utilizes four cycles of clock 50 for each of remaining states 1, 2, and 3 as in the prior art store operation depicted in FIG. 4A. However, because state 0 does not affect transactions on communication network 30 and is purely internal to master control logic 70, state 0 is accomplished in two cycles of clock 50, thereby permitting the store operation to be performed in four fewer processor clock cycles.

To summarize the foregoing, according to the present invention addresses and data are launched onto the communication network of a data processing system and read from the communication network in response to timing signals having individually selectable frequencies. Thus, the present invention permits complete control over the timing of communication transactions without any modification to conventional communication protocols. In addition, by independently clocking a processor's master and snooper circuitry, constraints on the relative timing of mastering and snooping operations are eliminated, giving greater flexibility in performing communication transactions. Moreover, by selectively operating portions of the communication logic that do not affect transactions on the communication network at processor clock frequency, communication performance is improved.

According to a second aspect of the present invention, the hereinbefore described principles can be extended for application to the design of an integrated circuit, such as a processor. This second aspect will now be described with reference to FIG. 5, which depicts a conceptual view of a second multiprocessor data processing system 110 including two processors 112a and 112b. As shown, processors 112a–112b are each coupled to communication network 130, which can be implemented in a variety of ways, as discussed above with respect to communication network 30 of FIG. 1. Data processing system 110 further includes a system memory 132 and a high (e.g., 1 GHz) fixed-frequency system clock 126, which is connected to clock broadcast interconnects 128a and 128b within processors 112a and 112b, respectively.

Processors 112a–112b each contain numerous subcircuits 114–122 (only a few of which are illustrated), which preferably comprise processing logic (e.g., a complex instruction set computing (CISC) or reduced instruction set computing (RISC) processor core), cache controllers for one or more levels of cache, communication logic that interfaces each processor to communication network 130, and other circuitry. Each of subcircuits 114–122 can be thought of as an "island" of tightly-coupled logic that, although interconnected to at least one other subcircuit, constitutes a discrete functional block of logic. For example, subcircuits 114a and 114b may each comprise a processor core. Alternatively, subcircuits 114a–114b may include only the logic for a single one of the multiple execution units within a superscalar processor core. Importantly, the boundaries of subcircuits 114–122 are preferably drawn such that the skew of the system clock signal between opposing boundaries of any particular subcircuit is less than a threshold skew above which errors may occur.

According to the second aspect of the present invention, subcircuits 114–122 can be independently and concurrently operated at diverse frequencies. Thus, while subcircuit 114a, which may comprise a processor core, may operate at the frequency of system clock 126 (e.g., 1 GHz), subcircuit 116a may operate at a first lower frequency (e.g., 500 MHz), and subcircuit 118a may operate at a second lower frequency (e.g., 250 MHz).

Figure 5:
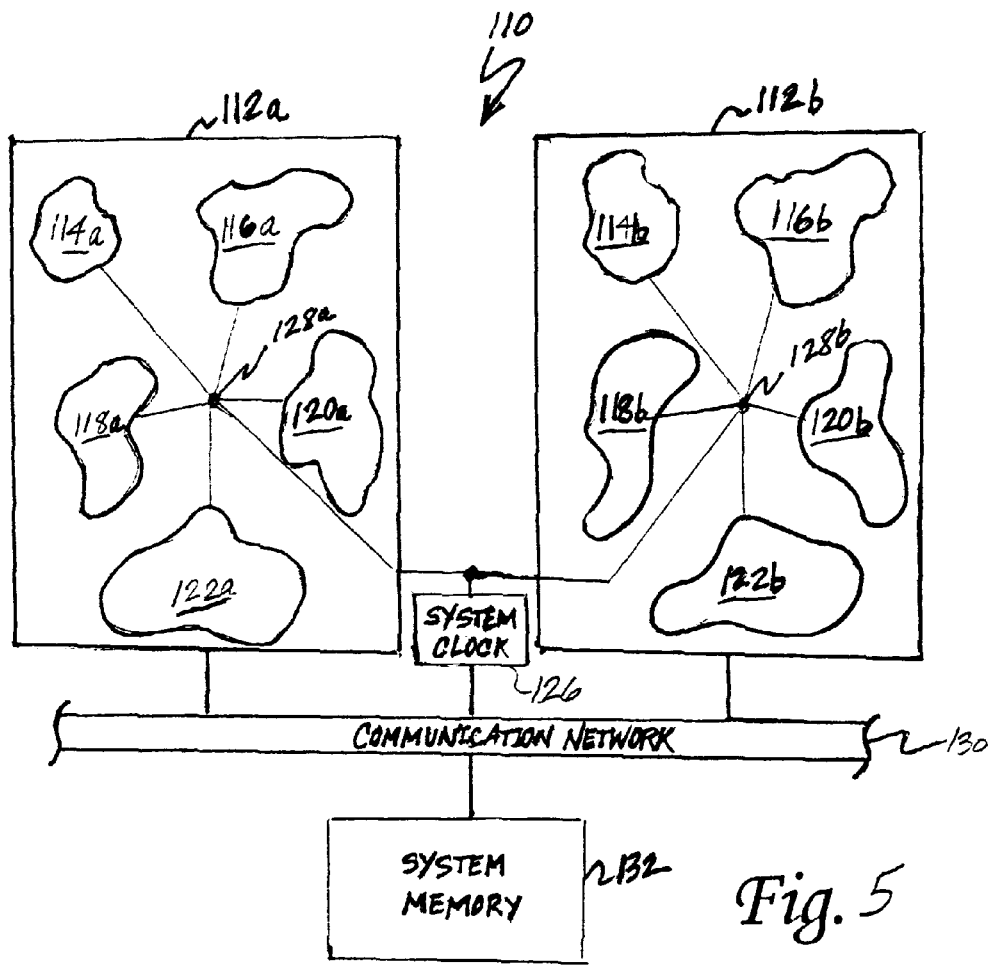
FIG. 5 is a conceptual view of a second data processing system, which, in accordance with the present invention, includes a processor containing subcircuits that are independently operable at diverse frequencies.
Figure 6:
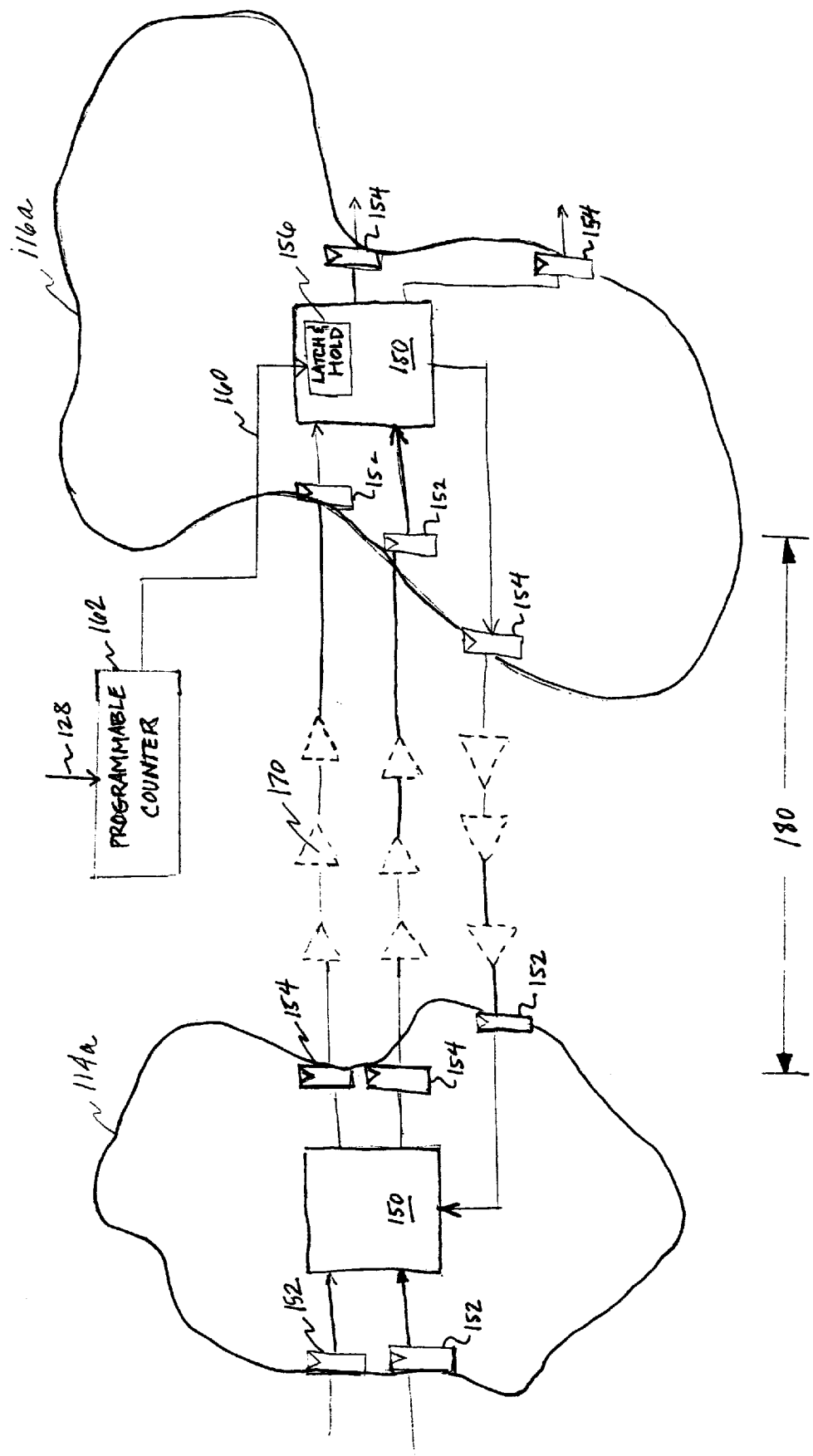
FIG. 6 is a more detailed view of two subcircuits within the processor illustrated in FIG. 5.

Referring now to FIG. 6, there is illustrated a more detailed view of subcircuits 114a and 116a within processor 12a of FIG. 5. As illustrated, subcircuits 114a and 116a each include a logic block 150 that performs the respective logical function of its subcircuit. For example, logic block 150 within subcircuit 114a may be a processor core that executes instructions, while logic block 150 within subcircuit 116a may be a level two (L2) cache controller. In addition, subcircuits 114a and 116a contain one input latch 152 for each subcircuit input and one output latch 154 for each subcircuit output. The enable inputs of input latches 152 and output latches 154 are each connected via unillustrated connections to clock broadcast interconnect 128a such that all of latches 152 and 154 latch in or latch out data at the frequency of system clock 126.

While input latches 152 and output latches 154 surrounding logic blocks 150 operate at the frequency of system clock 126, according to the present invention logic blocks 150 within subcircuits 114–122 can independently and concurrently operate at diverse frequencies. This can be accomplished despite the fact that system clock 126 is the only clock signal broadcast throughout processor 112a through the incorporation of one or more latch-and-hold circuits 156 within each subcircuit (e.g., subcircuit 116a) that is designed to operate at a lower frequency. In a preferred embodiment, latch-and-hold circuits 156 are configured like latch-and-hold circuit 90 of FIG. 3. In this preferred embodiment, a signal internal to logic block 50 is clocked between the input and output of each latch-and-hold circuit 156 in response to evaluate signal 160, which is generated by programmable counter 162 in response to the clock signal generated by system clock 126.

Programmable counter 162 is initialized to a programmed value and thereafter advances (i.e., increments or decrements) in response to each cycle of system clock 126. However, the evaluate signal generated by programmable counter 162 transitions between an active state and an inactive state only in response to the value of the programmable counter returning to its original value (i.e., overflowing or underflowing). Thus, by providing multiple programmable counters 162 with different programmed values, subcircuits 114–122 can be operated at any desired fraction of the frequency of system clock 126.

As illustrated in FIG. 6, signals are transmitted between subcircuits 114a and 116a by interconnecting the latched subcircuit outputs of one subcircuit with the latched subcircuit inputs of the other subcircuit. The particular communication protocol utilized to communicate signals between subcircuits is implementation-specific, but may be synchronous or asynchronous, and may include both data and handshaking signals (e.g., valid signals, ready signals, etc.). Because subcircuits 114a and 116a may be spaced relatively far apart in the floorplan of processor 112a, one or more buffer/repeaters 170 may optionally be included in each signal path connecting the two subcircuits. As shown at reference numeral 180, the distance between any two subcircuits within processor 112a is preferably no more than the distance a signal can propagate in one cycle of system clock 126. While this places a nominal constraint on the floorplan of processor 112a, in reality an integrated circuit designer retains great freedom in the placement of subcircuits since the clock skew constraint between subcircuits can be relaxed because of the latch-to-latch communication interface between subcircuits.

As has been described, the present invention provides an improved integrated circuit capable of high frequency operation. In order to address problems that may potentially arise from clock skew, the integrated circuit is partitioned into a number of tightly-coupled subcircuits within which the skew of a single broadcast clock signal is minimized. Because the subcircuits communicate via latch-to-latch interfaces, a significantly greater skew is permitted between subcircuits, thereby giving integrated circuit designers greater freedom in arranging the chip floorplan. Design flexibility is also enhanced by permitting subcircuits within the integrated circuit to concurrently operate at diverse frequencies.

While the invention has been particularly shown and described with reference to a preferred embodiment, it will be understood by those skilled in the art that various changes in form and detail may be made therein without departing from the spirit and scope of the invention.

What is claimed is:

1. A circuit, comprising:
   a multiplexer having at least two inputs to receive at least two multiplexer input signals and at least one output to output at least one multiplexer output signal;
   a latch having at least one input to receive said at least one multiplexer output signal and at least one output to output at least one latch output signal, said at least one latch output signal forming one of said at least two multiplexer input signals;
   an evaluate signal to activate said multiplexer to output one of said two multiplexer input signals as said at least one multiplexer output signal; and a clock signal to activate said latch to output said at least one latch output signal.

2. The circuit of claim 1, wherein said evaluate signal has a first frequency and said clock signal has a second frequency, and wherein said second frequency is higher than said first frequency.

3. The circuit of claim 2, and further comprising a programmable counter having a counter input coupled to said clock signal and a counter output to output said evaluate signal in response to said clock signal.

4. The circuit of claim 2, wherein said multiplexer and said latch together comprise a latch-and-hold circuit, and wherein said circuit further comprises:
    a semiconductor substrate;
    a clock distribution network that broadcasts said clock signal as an only broadcast clock signal; and
    a plurality of subcircuits, formed within said semiconductor substrate, that are each connected to said clock distribution network, wherein each of said plurality of subcircuits has a latch interface for all input and output data signals and wherein skew of said clock signal across any of said plurality of subcircuits is less than an error threshold;
    wherein at least a first subcircuit among said plurality of subcircuits contains said latch-and-hold circuit coupled to receive a data signal as one of said at least two multiplexer input signals and functional logic coupled to said latch output signal, such that propagation of said data signal to said functional logic is regulated by said evaluate signal and said first subcircuit operates at said first frequency.

5. The circuit of claim 4, said plurality of subcircuits including a second subcircuit that operates at a different frequency than said first subcircuit.

6. The circuit of claim 5, wherein said second subcircuit operates at said second frequency in response to said clock signal.

7. The circuit of claim 6, wherein said second subcircuit comprises a processor core.

8. The circuit of claim 5, wherein said first subcircuit and said second subcircuit are coupled by at least one data line, and wherein communication between said first subcircuit and said second subcircuit via said at least one data line is synchronous with respect to said clock.

9. The circuit of claim 8, said latch interface of said first subcircuit comprising:
    at least one subcircuit input and at least one subcircuit output;
    an input latch having an enable input connected to said clock signal and a data input coupled to said at least one subcircuit input, wherein said input latch latches data present at said data input in response said clock signal; and
    an output latch having an enable input connected to said clock signal and a data output coupled to said at least one subcircuit output, wherein said output latch outputs data stored by said latch to said data output in response said clock signal.

10. The circuit of claim 5, wherein said first subcircuit and said second subcircuit are coupled by at least one data line, and wherein communication of data between said first subcircuit and said second subcircuit via said at least one data line is asynchronous.

11. The circuit of claim 10, said second subcircuit further comprising:
    a subcircuit output coupled to a subcircuit input of said first subcircuit; and
    an output latch having an enable input connected to said clock signal and a data output coupled to said at least one subcircuit output, wherein said output latch outputs a handshake protocol signal to said data output only in response to receipt at said second subcircuit of both an active state of said clock signal and an input from said first subcircuit.

12. A circuit, comprising:
    a clock distribution network that broadcasts said clock signal as an only broadcast clock signal;
    a plurality of subcircuits that are each connected to said clock distribution network, wherein each of said plurality of subcircuits has a latch interface for all input and output data signals and wherein skew of said clock signal across any of said plurality of subcircuits is less than an error threshold, wherein at least a first subcircuit among said plurality of subcircuits includes:
        a latch-and-hold circuit including:
            a multiplexer having at least two inputs to receive at least two multiplexer input signals and at least one output to output at least one multiplexer output signal, wherein a data signal forms one of said at least two multiplexer input signals;
            a latch having at least one input to receive said at least one multiplexer output signal, at least one output to output at least one latch output signal, and an enable input coupled to said clock signal, said at least one latch output signal forming one of said at least two multiplexer input signals;
            an evaluate signal to activate said multiplexer to output one of said two multiplexer input signals as said at least one multiplexer output signal, said evaluate signal having a first frequency; and
        functional logic coupled to said latch output signal, such that propagation of said data signal to said functional logic is regulated by said evaluate signal and said first subcircuit operates at said first frequency.

13. The circuit of claim 12, wherein said evaluate signal has a first frequency and said clock signal has a second frequency, and wherein said second frequency is higher than said first frequency.

14. The circuit of claim 13, and further comprising a programmable counter having a counter input coupled to said clock signal and a counter output to output said evaluate signal in response to said clock signal.

15. The circuit of claim 12, said plurality of subcircuits including a second subcircuit that operates at a different frequency than said first subcircuit.

16. The circuit of claim 15, wherein said second subcircuit operates at said second frequency in response to said clock signal.

17. The circuit of claim 16, wherein said second subcircuit comprises a processor core.

18. A data processing system, comprising:
    an interconnect; and
    a circuit in accordance with claim 17 and a memory that are each coupled to said interconnect.

19. The circuit of claim 15, wherein said first subcircuit and said second subcircuit are coupled by at least one data line, and wherein communication between said first subcircuit and said second subcircuit via said at least one data line is synchronous with respect to said clock.

20. The circuit of claim 19, said latch interface of said first subcircuit comprising:
    at least one subcircuit input and at least one subcircuit output;

an input latch having an enable input connected to said clock signal and a data input coupled to said at least one subcircuit input, wherein said input latch latches data present at said data input in response said clock signal; and an output latch having an enable input connected to said clock signal and a data output coupled to said at least one subcircuit output, wherein said output latch outputs data stored by said latch to said data output in response said clock signal.

21. The circuit of claim 15, wherein said first subcircuit and said second subcircuit are coupled by at least one data line, and wherein communication of data between said first subcircuit and said second subcircuit via said at least one data line is asynchronous.

22. The circuit of claim 21, said second subcircuit further comprising:

a subcircuit output coupled to a subcircuit input of said first subcircuit; and an output latch having an enable input connected to said clock signal and a data output coupled to said at least one subcircuit output, wherein said output latch outputs a handshake protocol signal to said data output only in response to receipt at said second subcircuit of both an active state of said clock signal and an input from said first subcircuit.

23. A method of operating a latch-and-hold circuit including a multiplexer and a latch, said method comprising:

receiving at the multiplexer at least two multiplexer input signals and outputting from the multiplexer at least one multiplexer output signal;

receiving at the latch said at least one multiplexer output signal and outputting from the latch at least one latch output signal, said at least one latch output signal forming one of said at least two multiplexer input signals;

activating said multiplexer with an evaluate signal having a first frequency to output one of said two multiplexer input signals as said at least one multiplexer output signal; and activating said latch to output said at least one latch output signal with a clock signal having a second frequency.

24. The method of claim 23, wherein activating said latch with a clock signal having a second frequency comprises activating said latch with a clock signal having a second frequency that is higher than said first frequency.

25. The method of claim 24, and further comprising generating said evaluate signal utilizing a programmable counter having a counter input coupled to said clock signal and a counter output to output said evaluate signal.

26. The method of claim 24, and further comprising:

within an integrated circuit, broadcasting said clock signal as an only broadcast clock signal;

partitioning said integrated circuit into a plurality of subcircuits that each have less than a threshold amount of internal clock skew, wherein said partitioning includes providing a respective latch interface for each of said plurality of subcircuits;

communicating signals between said plurality of subcircuits only through said latch interfaces to allow greater than said threshold amount of clock skew between said plurality of subcircuits; and operating a first subcircuit among said plurality of subcircuits at less than said second frequency of said clock signal by coupling said latch-and-hold circuit to receive a data input as one of said at least two multiplexer input signals and to output said latch output signal to functional logic of said first subcircuit, wherein propagation of said data signal to said functional logic is regulated by said evaluate signal.

27. The method of claim 26, and further comprising operating a second subcircuit among said plurality of subcircuits at a different frequency than said first subcircuit.

28. The method of claim 27, wherein operating a second subcircuit among said plurality of subcircuits at a different frequency than said first subcircuit comprises operating said second subcircuit at said second frequency in response to said clock signal.

29. The method of claim 28, wherein operating said second subcircuit comprises executing an instruction within a processor core.

30. The method of claim 27, wherein said first subcircuit and said second subcircuit are coupled by at least one data line, said method further comprising communicating data between said first subcircuit and said second subcircuit via said at least one data line synchronously with respect to said clock.

31. The method of claim 27, wherein said first subcircuit and said second subcircuit are coupled by at least one data line, said method further comprising communicating data between said first subcircuit and said second subcircuit via said at least one data line asynchronously.

* * * * *

UNITED STATES PATENT AND TRADEMARK OFFICE
CERTIFICATE OF CORRECTION

PATENT NO. : 6,161,189
DATED : December 12, 2000
INVENTOR(S) : Arimilli et al.

It is certified that error appears in the above-identified patent and that said Letters Patent is hereby corrected as shown below:

Column 2,
Line 49, please insert the word -- logic -- after the word communication.

Signed and Sealed this

Twenty-fifth Day of December, 2001

Attest:

JAMES E. ROGAN
*Attesting Officer*     *Director of the United States Patent and Trademark Office*